United States Patent
Ohhata et al.

(10) Patent No.: US 10,268,426 B2
(45) Date of Patent: Apr. 23, 2019

(54) IMAGE PROCESSING APPARATUS, METHOD AND NON-TRANSITORY COMPUTER READABLE-MEDIUM FOR ADJUSTING WIRELESS COMMUNICATION DISTANCE EQUAL TO NEAR FIELD COMMUNICATION DISTANCE

(71) Applicant: KONICA MINOLTA, INC., Chiyoda-ku, Tokyo (JP)

(72) Inventors: Akira Ohhata, Toyokawa (JP); Hisataka Funakawa, Okazaki (JP); Tomoo Yamanaka, Toyokawa (JP)

(73) Assignee: KONICA MINOLTA, INC., Chiyoda-ku, Tokyo (JP)

(*) Notice: Subject to any disclaimer, the term of this patent is extended or adjusted under 35 U.S.C. 154(b) by 28 days.

(21) Appl. No.: 15/006,406

(22) Filed: Jan. 26, 2016

(65) Prior Publication Data

US 2016/0216921 A1  Jul. 28, 2016

(30) Foreign Application Priority Data

Jan. 26, 2015 (JP) ................................. 2015-012319

(51) Int. Cl.
*G06F 3/12* (2006.01)
*H04W 4/80* (2018.01)
*G06F 1/3231* (2019.01)
*H04W 76/00* (2018.01)
*H04W 88/06* (2009.01)

(52) U.S. Cl.
CPC .......... *G06F 3/1236* (2013.01); *G06F 1/3231* (2013.01); *G06F 3/1203* (2013.01); *G06F 3/1211* (2013.01); *G06F 3/1292* (2013.01); *H04W 4/80* (2018.02); *H04W 76/00* (2013.01); *H04W 88/06* (2013.01)

(58) Field of Classification Search
CPC ............................. G06F 3/1292; G06F 3/1296
See application file for complete search history.

(56) References Cited

U.S. PATENT DOCUMENTS

2007/0149124 A1* 6/2007 Onozawa ............. H04B 5/0062
455/41.2
2008/0240827 A1* 10/2008 Yamazaki ............. G06F 3/1204
400/73

(Continued)

FOREIGN PATENT DOCUMENTS

JP        2008-310713 A    12/2008

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An image processing apparatus includes a first communication portion configured to wirelessly communicate with a terminal and a second communication portion configured to carry out near field communication with a terminal. A communication distance between the second communication portion and the terminal is shorter than a communication distance between the first communication portion and the terminal. The image processing apparatus further includes an adjustment portion configured to adjust a communication-established distance over which the first communication portion establishes communication with the terminal so as to match with a specific position at which the second communication portion establishes communication with the terminal.

19 Claims, 21 Drawing Sheets

(56) References Cited

U.S. PATENT DOCUMENTS

| | | | | |
|---|---|---|---|---|
| 2010/0069008 A1* | 3/2010 | Oshima | ............... | H04W 4/02 |
| | | | | 455/41.3 |
| 2011/0019228 A1* | 1/2011 | Uchikawa | ............ | G06F 3/1204 |
| | | | | 358/1.15 |
| 2011/0026068 A1* | 2/2011 | Yoshida | ............ | H04N 1/00347 |
| | | | | 358/1.14 |
| 2011/0286028 A1* | 11/2011 | Kinouchi | ............ | G06F 21/35 |
| | | | | 358/1.14 |
| 2013/0128298 A1* | 5/2013 | Yamada | ............ | G06K 15/02 |
| | | | | 358/1.13 |
| 2014/0118769 A1* | 5/2014 | Adachi | ............ | G06F 3/1211 |
| | | | | 358/1.13 |
| 2014/0176991 A1* | 6/2014 | Yun | ............ | H04W 76/14 |
| | | | | 358/1.15 |
| 2014/0355048 A1* | 12/2014 | Kang | ............ | G06F 3/1292 |
| | | | | 358/1.15 |
| 2015/0036189 A1* | 2/2015 | Shiraga | ............ | G06F 3/1288 |
| | | | | 358/1.15 |

* cited by examiner

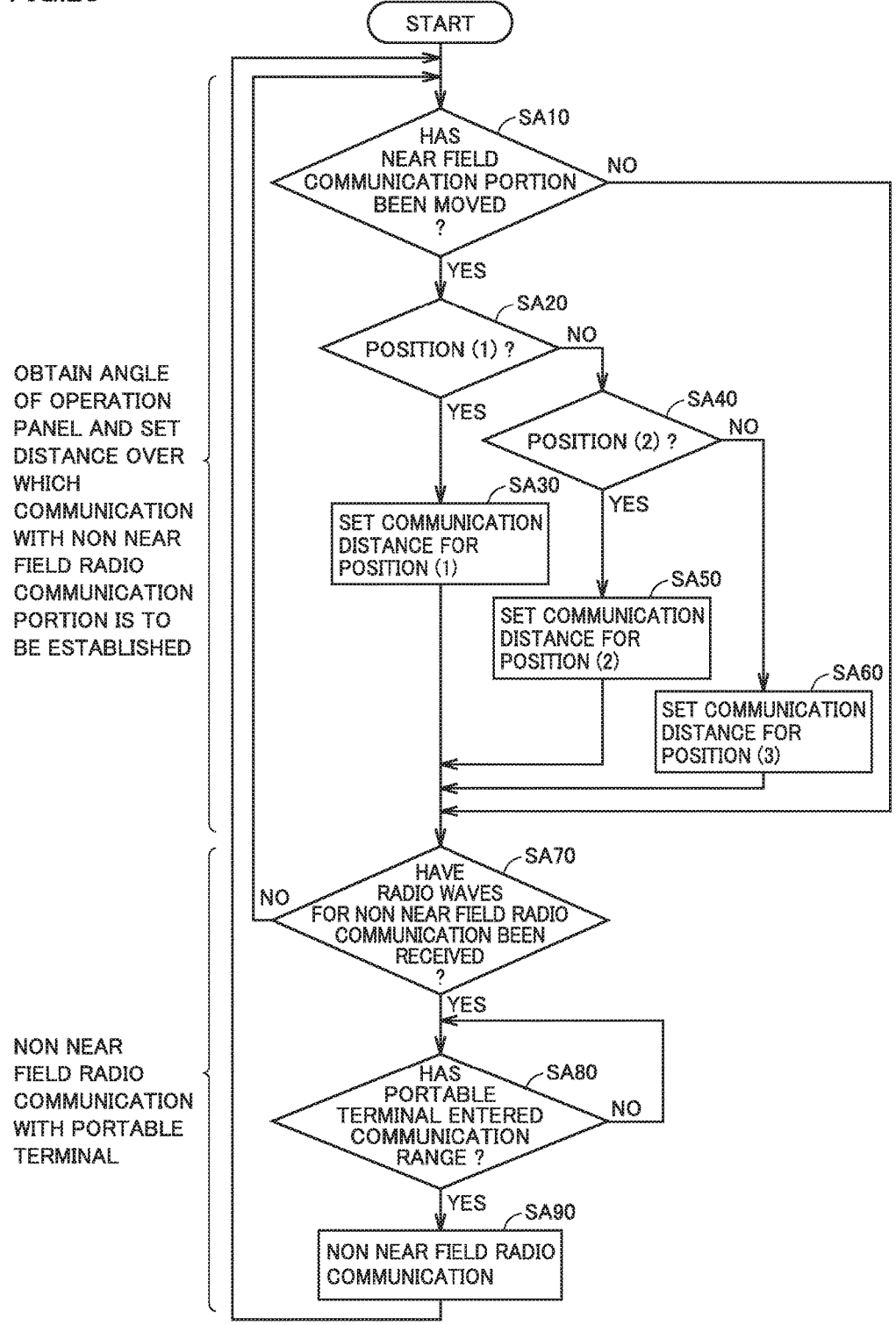

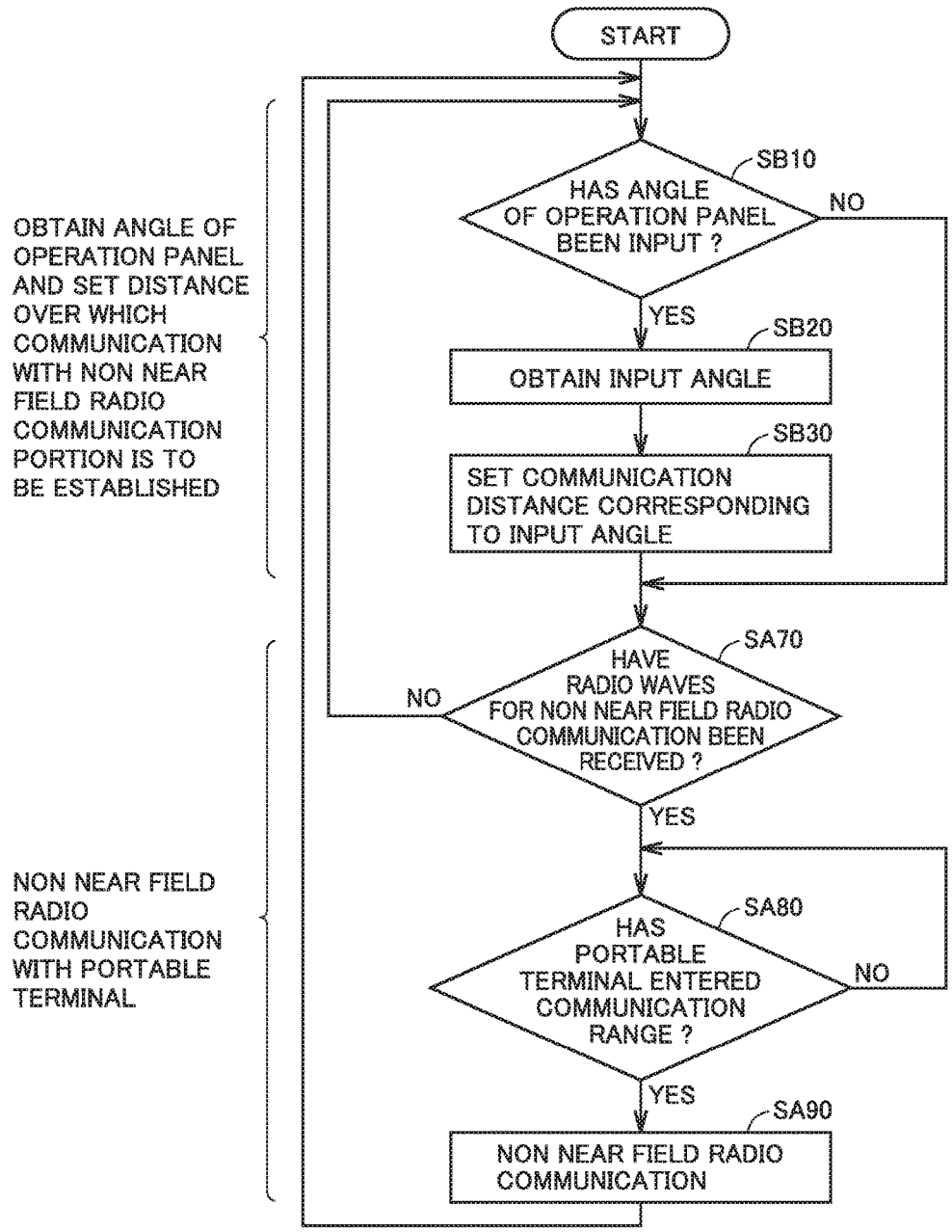

IMAGE PROCESSING APPARATUS, METHOD AND NON-TRANSITORY COMPUTER READABLE-MEDIUM FOR ADJUSTING WIRELESS COMMUNICATION DISTANCE EQUAL TO NEAR FIELD COMMUNICATION DISTANCE

This application is based on Japanese Patent Application No. 2015-012319 filed with the Japan Patent Office on Jan. 26, 2015, the entire content of which is hereby incorporated by reference.

BACKGROUND OF THE INVENTION

1. Field of the Invention

The present disclosure relates to an image processing apparatus, a method of controlling the same, and a storage medium, and particularly to an image processing apparatus capable of radio communication under a plurality of types of schemes, a method of controlling the same, and a storage medium storing a program executed in such an image processing apparatus.

2. Description of the Related Art

Some image processing apparatuses such as a multi-functional peripheral (MFP) wirelessly communicate with a terminal such as a smartphone. Various techniques have been disclosed for apparatuses wirelessly communicating with a terminal. For example, Japanese Laid-Open Patent Publication No. 2008-310713 discloses an electronic money charger. In the electronic money charger, an antenna of a non-contact integrated circuit (IC) card reader and writer is arranged forward below an inlet port of a card reader associated with the card reader writer.

There are a plurality of communication schemes made use of in a terminal.

For example, in many cases, a terminal adopting Android™ as an operating system incorporates a communication device adopting a near field communication (NFC) scheme of which communication distance is several cm or shorter.

On the other hand, in many cases, a terminal adopting iOS™ as an operating system incorporates a communication device adopting Bluetooth® of which communication distance is approximately several m.

With such a difference in communication distance, a user communicates by bringing the former terminal close to (or in contact with) a sensing portion of an image processing apparatus in order to have the terminal communicate with the image processing apparatus, whereas the user communicates without bringing the latter terminal close to the image processing apparatus in order to have the terminal communicate with the image processing apparatus. Such a difference in communication distance based on the difference in communication scheme in the terminal may confuse users in terms of operability.

SUMMARY OF THE INVENTION

In view of such circumstances, it has been needed to allow a position in an image processing apparatus where a terminal is set to be the same during communication, regardless of a communication scheme of a terminal of a communication counterpart.

According to one aspect of the present disclosure, an image processing apparatus includes a first communication portion configured to wirelessly communicate with a terminal and a second communication portion configured to carry out near field communication with a terminal. A communication distance between the second communication portion and the terminal is shorter than a communication distance between the first communication portion and the terminal. The image processing apparatus further includes an adjustment portion configured to adjust a communication-established distance over which the first communication portion establishes communication with the terminal so as to match with a specific position at which the second communication portion establishes communication with the terminal.

According to another aspect of the present disclosure, a method of controlling an image processing apparatus is provided. The image processing apparatus includes a first communication portion wirelessly communicating with a terminal and a second communication portion carrying out near field communication with a terminal at a communication distance shorter than a communication distance of the first communication portion. The control method includes adjusting a communication-established distance over which the first communication portion establishes communication with the terminal so as to match with a specific position on the image processing apparatus at which the second communication portion establishes communication with the terminal.

According to yet another aspect of the present disclosure, a non-transitory storage medium storing a program executed by a computer of an image processing apparatus including a first communication portion wirelessly communicating with a terminal and a second communication portion carrying out near field communication with a terminal at a communication distance shorter than a communication distance of the first communication portion is provided. The program causes the image processing apparatus to adjust a communication-established distance over which the first communication portion establishes communication with the terminal so as to match with a specific position on the image processing apparatus at which the second communication portion establishes communication with the terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a flowchart of processing performed in the MFP in the fifth embodiment.

FIG. 21 is a flowchart of processing performed in the MFP in a sixth embodiment.

DESCRIPTION OF THE PREFERRED EMBODIMENTS

Figure 1:
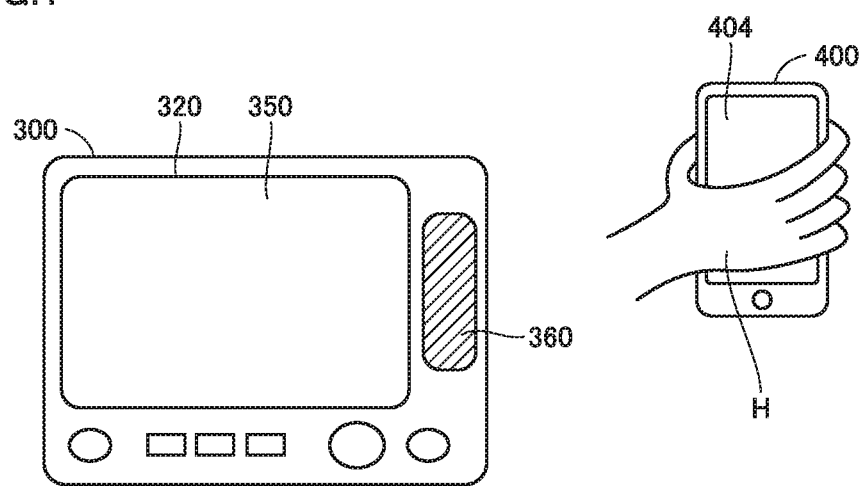
FIGS. 1 and 2 are diagrams showing an operation panel of an MFP and a portable terminal in near field communication with the MFP according to a first embodiment.

An embodiment of an image processing apparatus will be described hereinafter with reference to the drawings. In the description below, the same elements and components have the same reference characters allotted. Their label and function are also identical. Therefore, description thereof will not be repeated.

First Embodiment

<1. Overview>

Figure 2:
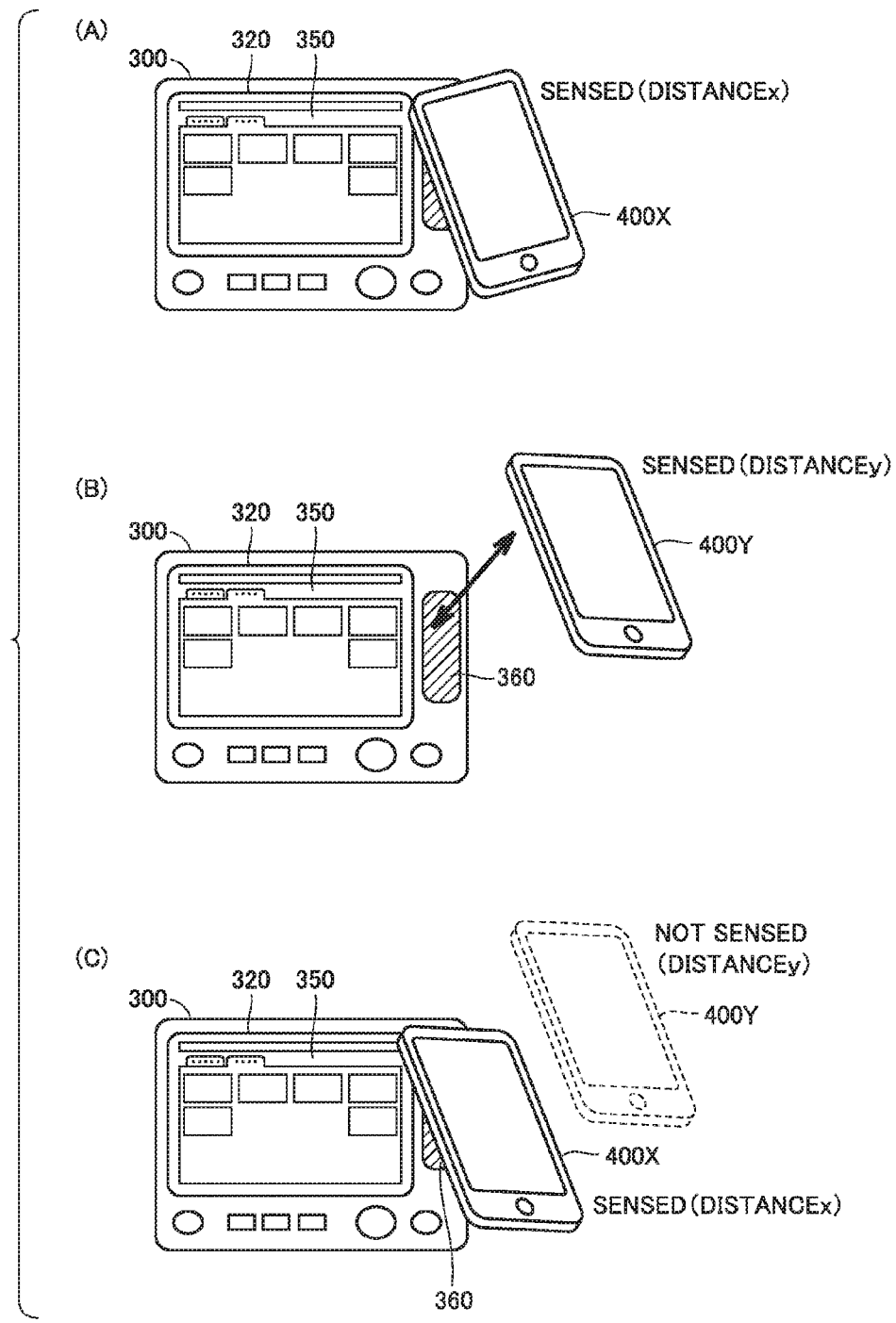

Overview of an image processing apparatus according to a first embodiment of the present disclosure will be described with reference to FIGS. 1 and 2. In the present disclosure, a multi-functional peripheral (MFP) is adopted as one embodiment of the image processing apparatus. FIGS. 1 and 2 are diagrams showing an operation panel of the MFP and a portable terminal in near field communication with the MFP according to the first embodiment.

The MFP communicates under at least two types of communication schemes. Two types of communication under the two types of communication schemes are herein distinguished from each other as "non near field radio communication" and "near field communication." "Non near field radio communication" means communication under such a scheme as Bluetooth. "Near field communication" means radio (not wired) communication and means communication under such a scheme as NFC shorter in communication distance than "non near field radio communication."

Referring to FIG. 1, the MFP in the first embodiment includes an operation panel 300. Operation panel 300 includes a display 320 and a touch sensor 350. FIG. 1 shows a portable terminal 400 as a communication counterpart with the MFP (operation panel 300). Portable terminal 400 includes a display 404. A hand H represents a hand of a user who holds portable terminal 400. Portable terminal 400 is herein adopted as a collective denotation of a communication counterpart of the MFP (operation panel 300). When a plurality of portable terminals 400 are distinguished from one another, such denotations as a "portable terminal 400X," a "portable terminal 400Y," a "portable terminal 400A," and a "portable terminal 400B" are adopted.

Operation panel 300 contains a communication device for near field communication. In a housing of operation panel 300, a region for indicating preferred positioning of a terminal which communicates with an MFP through near field communication is set as a touch area 360. Touch area 360 is shown, for example, as a frame printed on the housing of operation panel 300. In operation panel 300, touch area 360 is arranged in the vicinity of the communication device for near field communication. Thus, denotation a "distance between touch area 360 and portable terminal 400" herein may mean a "distance between the communication device for near field communication and portable terminal 400." Touch area 360 represents one example of an indication portion indicating a specific position representing a position of a terminal which communicates with a second communication portion.

Among three states (A) to (C) shown in FIG. 2, state (A) shows operation panel 300 and portable terminal 400X which communicates with operation panel 300 through "near field communication." A distance between touch area 360 and portable terminal 400X in state (A) is denoted as a distance x.

State (B) shows operation panel 300 and portable terminal 400Y which communicates with operation panel 300 through "non near field radio communication." A distance between touch area 360 and portable terminal 400Y in state (B) is denoted as a distance y. Distance y is longer than distance x in state (A). In state (B), operation panel 300 and portable terminal 400Y communicate with each other at a communication distance through non near field radio communication before adjustment in the first embodiment.

When portable terminal 400 communicates with the MFP through "non near field radio communication," it can communicate at a position more distant from the MFP than in communication through "near field communication." Namely, "non near field radio communication" is longer in communication distance than "near field communication." Therefore, unless the communication distance in "non near field radio communication" is adjusted in the MFP, portable terminal 400 may establish non near field radio communication with the MFP at a position more distant from touch area 360 than a distance over which near field communication can be carried out, as shown with states (A) and (B). Namely, at the position shown with state (B), though a user can establish non near field radio communication between portable terminal 400 and the MFP, the user cannot establish near field communication therebetween. In order to establish near field communication, the user has to bring portable terminal 400 closer to touch area 360. Thus, the user has had to change a position over which portable terminal 400 should be held, depending on a type of a communication scheme, that is, depending on whether the scheme is either "non near field radio communication" or "near field communication."

In the MFP in the first embodiment, a distance necessary for establishing non near field radio communication is adjusted to match with a distance at which communication through near field communication is to be established (that is, a communication distance in near field communication). More specifically, in the MFP, such control is implemented that non near field radio communication with portable terminal 400 is not established at distance y in state (B), while non near field radio communication with portable terminal 400 is established at distance x in state (A). Thus, as shown with state (C) in FIG. 4, the user can establish communication between the MFP (operation panel 300) and portable terminal 400 when the user holds portable terminal 400 over a position distant by the same distance from touch area 360 either in near field communication (portable terminal 400X) or in non near field radio communication (portable terminal 400Y).

<2. Appearance of MFP>

Figure 3:
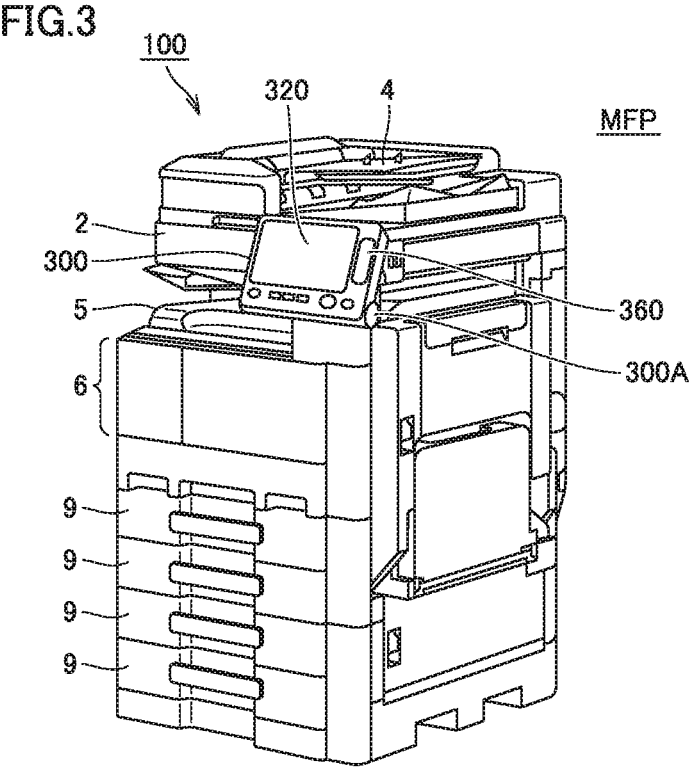
FIG. 3 is a diagram showing appearance of the MFP representing one embodiment of an image processing apparatus.

FIG. 3 is a diagram showing appearance of the MFP representing one embodiment of an image processing apparatus.

As shown in FIG. 3, MFP 100 includes a scanner portion 2 which obtains image data by optically reading a document and a print portion 6 which prints an image on paper based on the image data. A feeder 4 which sends a document to scanner portion 2 is arranged in an upper surface of the main body of MFP 100 representing an image formation apparatus. A plurality of paper feed portions 9 which supply paper to print portion 6 are arranged in a lower portion of MFP 100. A tray 5 to which paper having an image formed by print portion 6 is ejected is arranged in a central portion of MFP 100.

In MFP 100, operation panel 300 is attached on a front surface side in an upper portion of the main body of MFP 100. The "front surface" refers to a surface of MFP 100 which faces a user who uses MFP 100. Operation panel 300 has an outer geometry substantially like a plate. In MFP 100, operation panel 300 is placed such that a main surface thereof is inclined with respect to a vertical direction. Operation panel 300 may be provided with a mechanism for changing an angle of operation panel 300 in accordance with a state of a user (for example, a height of a user or whether or not a user sits on a wheelchair).

<3. Hardware Configuration of MFP>

(Configuration of Main Body of MFP)

Figure 4:
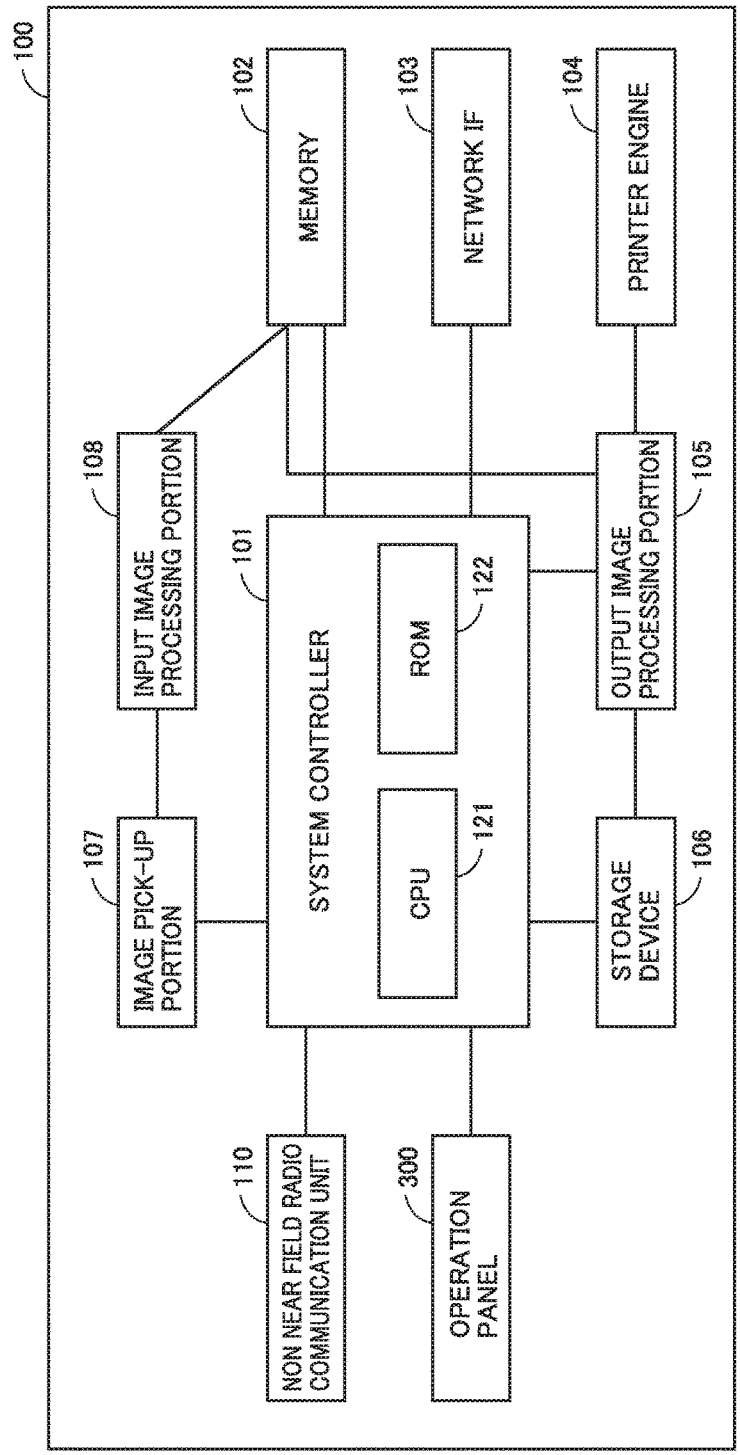
FIG. 4 is a block diagram showing a configuration of the MFP.

FIG. 4 is a block diagram showing a configuration of MFP 100.

Referring to FIG. 4, MFP 100 includes a system controller 101, a memory 102, a network interface (I/F) 103, a printer engine 104, an output image processing portion 105, a storage device 106, an image pick-up portion 107, an input image processing portion 108, and operation panel 300. System controller 101 is connected to memory 102, network interface 103, printer engine 104, output image processing portion 105, storage device 106, image pick-up portion 107, input image processing portion 108, and operation panel 300, for example, through an internal bus.

System controller 101 controls entire MFP 100 for various jobs such as a scanning job, a copy job, a mail transmission job, and a print job. System controller 101 includes a central processing unit (CPU) 121 and a read only memory (ROM) 122.

CPU 121 executes a control program stored in ROM 122. ROM 122 stores various programs for controlling an operation of MFP 100 and various types of fixed data. CPU 121 reads data from and writes data into memory 102 by performing prescribed processing.

Memory 102 is implemented, for example, by a random access memory (RAM), and used, for example, for temporary storage of data necessary for CPU 121 to execute a control program and image data.

Network interface 103 communicates with an external device through a network in response to an instruction from system controller 101.

Printer engine 104 performs processing for printing on paper based on print data processed by output image processing portion 105. In particular, when MFP 100 operates as a printer, printer engine 104 prints an image, and when MFP 100 operates as a copying machine, printer engine 104 prints an image read by image pick-up portion 107.

For example, in printing of an image, output image processing portion 105 performs conversion processing for converting a data format of the image into a data format for printing.

Storage device 106 is implemented, for example, by a hard disk drive (HDD), and stores various types of data relating to an operation of MFP 100. Storage device 106 may further store image data on a picture shown on operation panel 300 of MFP 100.

Image pick-up portion 107 reads an image of a document and outputs the image to input image processing portion 108.

Input image processing portion 108 performs conversion processing for converting a format of image data when an image is read by image pick-up portion 107.

In MFP 100, an operation of MFP 100 as described herein is implemented as CPU 121 executes an appropriate program. A program executed by CPU 121 may be stored in ROM 122 as described above, stored in storage device 106, or stored in a storage medium attachable to or removable from MFP 100. A storage medium storing the program is a medium storing data in a non-volatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (except for memory cards), an optical card, a mask ROM, an EPROM, an EEPROM (Electronically Erasable Programmable Read-Only Memory), and the like.

The program according to the present disclosure may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present invention.

The program according to the present invention may be provided in a manner incorporated as a part of another program. In such a case as well, the program itself does not include the module included in another program, but the program executes the processing in cooperation with another program. Such a program incorporated in another program may also be encompassed in the program according to the present invention.

The provided program product is installed in a program storing portion such as a hard disk for execution. It is noted that the program product includes the program itself and a recording medium recording the program.

(Configuration of Operation Panel)

Figure 5:
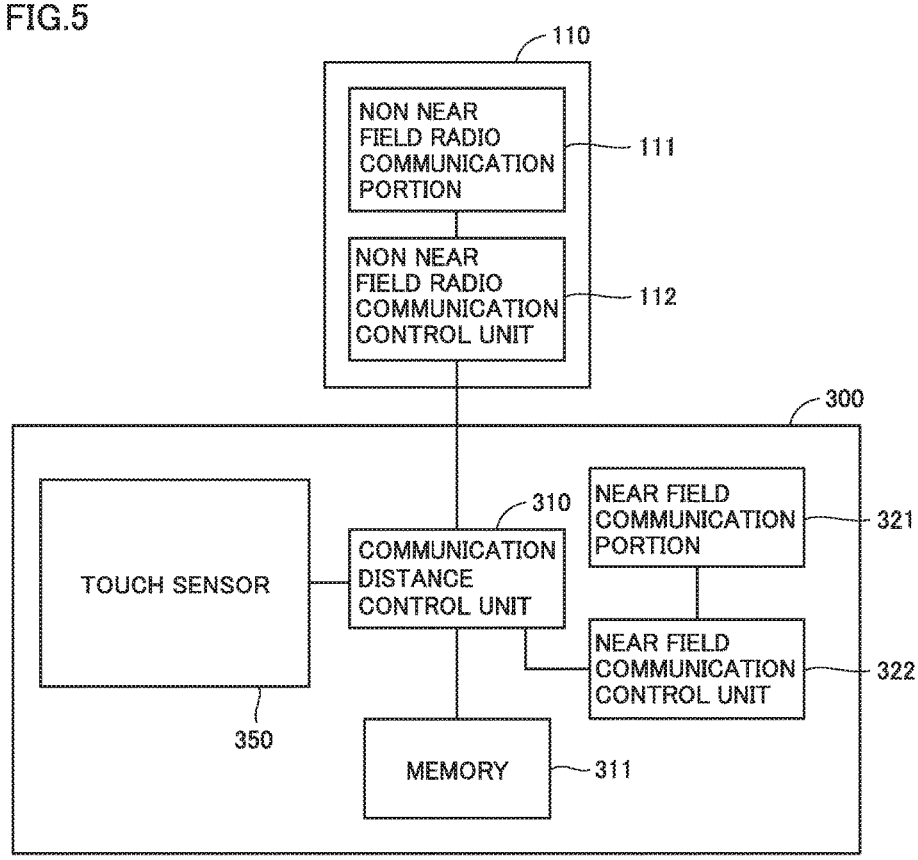
FIG. 5 is a diagram showing a block configuration including a portion of an operation panel made use of for control in the first embodiment.

FIG. 5 is a diagram showing a block configuration including a portion of operation panel 300 made use of for control in the first embodiment. In MFP 100, operation panel 300 is herein handled as being attached to a main body of MFP 100. A configuration of operation panel 300 will be described with reference to FIGS. 1 and 5.

As shown in FIG. 1, operation panel 300 includes display 320 and touch sensor 350 is provided on display 320. As shown in FIG. 5, operation panel 300 includes a communication distance control unit 310, a memory 311, a near field communication portion 321, and a near field communication control unit 322, in addition to touch sensor 350. In MFP 100, display 320 shows, for example, arrangement of a software key. When a position corresponding to a software key on touch sensor 350 which is displayed on display 320 is touched, the MFP performs an operation in accordance with the key corresponding to the touched position. As shown in FIG. 1, touch area 360 is arranged in the vicinity of touch sensor 350. Thus, the user can have portable terminal 400 communicate with the MFP while the user views operation panel 300.

Communication distance control unit 310 is implemented, for example, by a control circuit including a CPU. The CPU of communication distance control unit 310 may be implemented by CPU 121 of the main body of MFP 100 or may be provided separately from CPU 121.

Memory 311 may be implemented by a storage medium such as an EEPROM. Memory 311 may be fixed to a main body of operation panel 300 or may be attachable to or removable from the main body.

Near field communication portion 321 and near field communication control unit 322 implement a communication device for near field communication in MFP 100. Near field communication portion 321 is implemented, for example, by an antenna catching radio waves for non near field radio communication. Near field communication control unit 322 is implemented, for example, by a communication circuit encoding radio waves caught by near field communication portion 321.

Communication distance control unit 310 is connected to a non near field radio communication unit 110 on a side of the main body of MFP 100. Non near field radio communication unit 110 includes a non near field radio communication portion 111 and a non near field radio communication control unit 112. Non near field radio communication portion 111 is implemented, for example, by an antenna portion for non near field radio communication. Non near field radio communication control unit 112 is implemented, for example, by a communication circuit which encodes radio waves received through non near field radio communication. In operation panel 300, communication distance control unit 310 can obtain information received by MFP 100 through non near field radio communication, by being connected to non near field radio communication control unit 112.

<4. Hardware Configuration of Portable Terminal>

Figure 6:
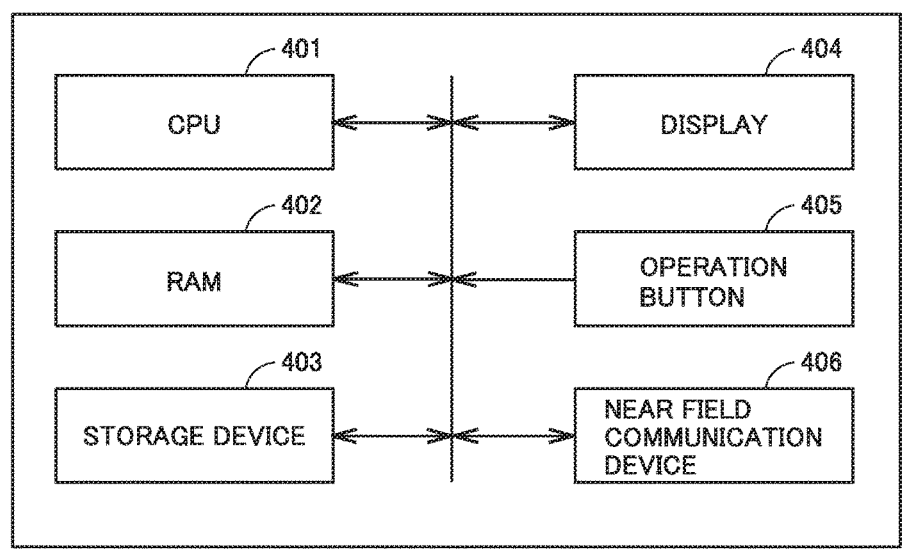
FIG. 6 is a diagram showing one example of a hardware configuration of the portable terminal.
Figure 7:
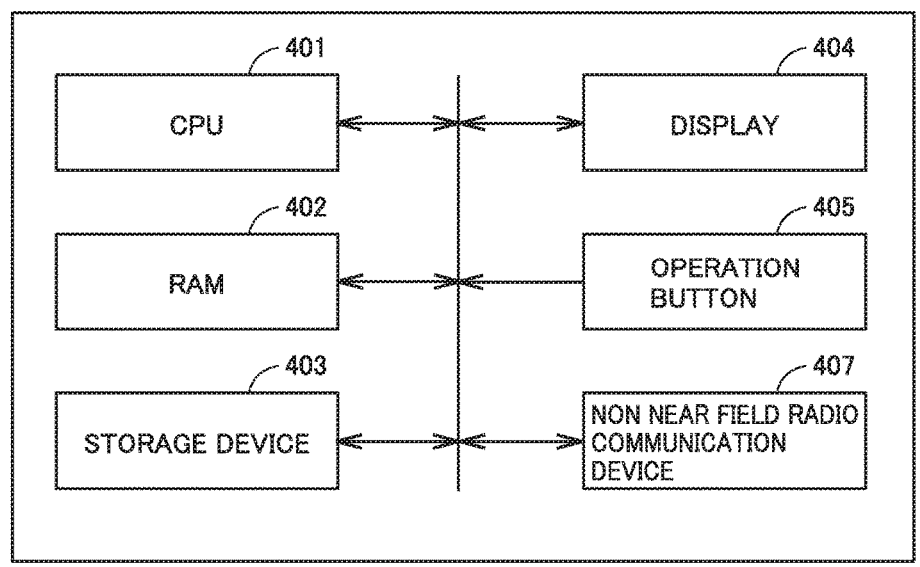
FIG. 7 is a diagram showing another example of a hardware configuration of the portable terminal.

FIGS. 6 and 7 are diagrams each showing one example of a hardware configuration of portable terminal 400. FIG. 6 shows a hardware configuration of portable terminal 400X which communicates only through near field communication with MFP 100. FIG. 7 shows a hardware configuration of portable terminal 400Y which communicates only through non near field radio communication with MFP 100.

Referring initially to FIG. 6, portable terminal 400X includes as main constituent elements, a CPU 401, a RAM 402, a storage device 403, display 404, an operation button 405, and a near field communication device 406. CPU 401, RAM 402, storage device 403, display 404, operation button 405, and near field communication device 406 are connected to one another through an internal bus.

CPU 401 represents one example of an arithmetic unit performing processing for controlling overall operations of portable terminal 400X.

RAM 402 functions as a work area while CPU 401 performs processing.

Storage apparatus 403 saves data of various programs such as an operating system (OS) program and an application program executed by CPU 401 and data made use of for execution of such a program. Storage device 403 includes, for example, a medium storing data in a non-volatile manner such as an EEPROM. A program downloaded through a network may also be installed in storage device 403.

Display 404 is a display apparatus for displaying an image showing a result of processing of a program executed by CPU 401.

Operation button 405 represents one example of an input apparatus for inputting information into portable terminal 400X such as input of an instruction for processing of an application being executed. A touch sensor provided on display 404 represents another example of an input apparatus included in portable terminal 400X.

Near field communication device 406 represents one example of a communication device for communicating information with an external device such as MFP 100, for example, under the NFC specifications. Near field communication device 406 includes, for example, an antenna portion and an encoding circuit as in the configuration shown for near field communication portion 321 and near field communication control unit 322 in FIG. 5.

Referring next to FIG. 7, portable terminal 400Y includes a non near field radio communication device 407 instead of near field communication device 406 of portable terminal 400X. Non near field radio communication device 407 includes, for example, an antenna portion and an encoding circuit as in the configuration shown for non near field radio communication portion 111 and non near field radio communication control unit 112 in FIG. 5.

Portable terminal 400 may include both of near field communication device 406 and non near field radio communication device 407.

<5. Functional Configuration>

Figure 8:
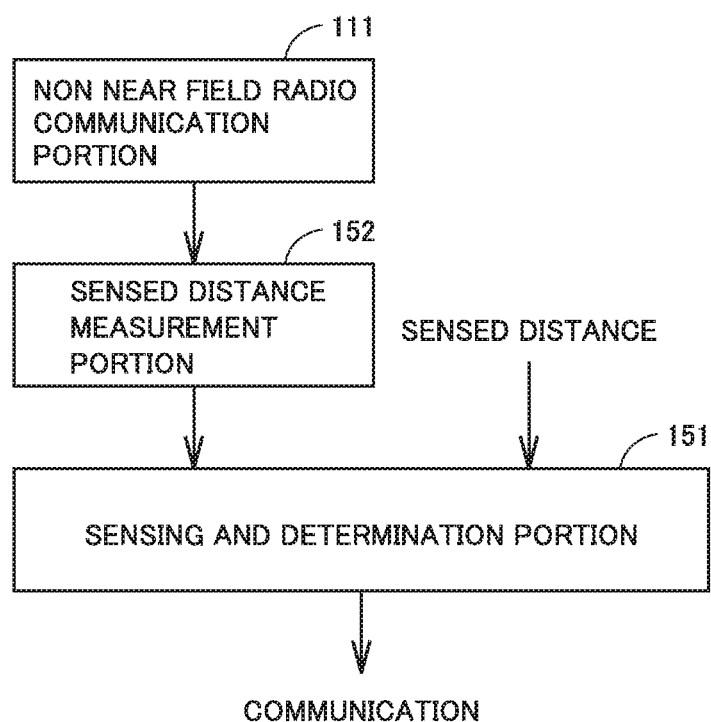
FIG. 8 is a diagram showing one example of a functional configuration for adjusting a communication distance in non near field radio communication in the MFP.

FIG. 8 is a diagram showing one example of a functional configuration for adjusting a communication distance in non near field radio communication in MFP 100. A functional configuration of MFP 100 will be described with reference to FIG. 8.

As shown in FIG. 8, MFP 100 includes a sensing and determination portion 151 and a sensed distance measurement portion 152. Sensing and determination portion 151 and sensed distance measurement portion 152 are implemented, for example, by CPU 121 executing an appropriate program.

Sensed distance measurement portion 152 obtains from non near field radio communication portion 111, intensity of radio waves received from portable terminal 400. Then, sensed distance measurement portion 152 measures a distance between portable terminal 400 and touch area 360 based on the obtained intensity. In measurement of a distance, for example, such a characteristic in non near field radio communication is made use of that intensity of radio waves received at a reception site is higher as a terminal which is a source of transmission of the radio waves is closer to a terminal at the reception site. More specifically, sensed distance measurement portion 152 measures a distance between portable terminal 400 and touch area 360, for example, by measuring a distance from non near field radio communication unit 110 to portable terminal 400 based on the radio wave intensity and subtracting a distance from non near field radio communication unit 110 to touch area 360 (stored in advance in storage device 106) from the distance.

Then, sensed distance measurement portion 152 outputs the distance obtained as the result of measurement to sensing and determination portion 151.

Sensing and determination portion 151 compares the distance input from sensed distance measurement portion 152 and the distance set in advance (a "sensed distance" in FIG. 8) with each other. The "sensed distance" is stored, for example, in storage device 106. Then, when the distance input from sensed distance measurement portion 152 is longer than the "sensed distance," sensing and determination portion 151 does not allow establishment of non near field radio communication with portable terminal 400. When the distance input from sensed distance measurement portion 152 is not greater than the "sensed distance," sensing and determination portion 151 allows establishment of non near field radio communication with portable terminal 400.

Under such control, a condition for establishing non near field radio communication with portable terminal 400 in MFP 100 includes a condition of coming closer to touch area 360 by a distance (distance x) or greater shown in state (A) in FIG. 2. Thus, non near field radio communication between MFP 100 (operation panel 300) and portable terminal 400 is not established in state (B) in FIG. 2 but established in state (A) in FIG. 2. Namely, in MFP 100, non near field radio communication can be established only when portable terminal 400 is brought closer to touch area 360 to such an extent that near field communication is started.

Thus, MFP 100 does not establish communication unless portable terminal 400 comes closer to MFP 100 by the same distance or greater in any of non near field radio communication and near field communication. In this sense, in MFP 100, control for determining whether or not to establish communication through non near field radio communication based on the "sensed distance" corresponds to control for matching a communication-established distance representing a distance from a first communication portion and a distance from a specific position, defined as a condition based on which the first communication portion establishes communication with the terminal, with a distance from a second communication portion to the specific position. Namely, sensing and determination portion 151 implements the adjustment portion.

In MFP 100, under such control, a user can establish communication by bringing portable terminal 400 closer to touch area 360 similarly whether a communication scheme of the communication device included in portable terminal 400 is either a non near field radio communication scheme or a near field communication scheme.

In the description above, sensed distance measurement portion 152 measures a distance between portable terminal 400 and non near field radio communication unit 110 based on intensity of received radio waves. The method of measuring a distance, however, is not limited to the above. Sensed distance measurement portion 152 may calculate a distance between portable terminal 400 and the antenna portion of non near field radio communication unit 110 in accordance with any other known method.

In MFP 100, comparison of radio wave intensity may be made instead of comparison of a distance by using the "sensed distance" for determining whether or not to establish communication through non near field radio communication. Namely, for example, in MFP 100, intensity of radio waves received by non near field communication portion 111 at the time when portable terminal 400 is held over operation panel 300 at a position shown with portable terminal 400X (state (A) or state (C) in FIG. 2) may be stored in storage device 106, for example, as a value like "sensed intensity." Then, CPU 121 (sensing and determination portion 151) may allow establishment of non near field radio communication on condition that intensity of radio waves obtained from non near field radio communication portion 111 is not lower than the "sensed intensity."

Second Embodiment

<1. Overview>

A hardware configuration of MFP 100 in a second embodiment can be the same as in the first embodiment except for a configuration specified below. In MFP 100 in the second embodiment, whether or not to establish non near field radio communication by using non near field radio communication portion 111 is determined by making use of a "sensed distance" (FIG. 8) made use of in the first embodiment and further taking into account a distance from touch area 360 to portable terminal 400 at the time when a user actually holds portable terminal 400 over touch area 360. Namely, in the second embodiment, MFP 100 corrects a distance from touch area 360 to portable terminal 400 at the time when non near field radio communication portion 111 establishes non near field radio communication based on a state of communication between portable terminal 400 and non near field radio communication portion 111 at a position where non near field radio communication with non near field radio communication portion 111 will be established.

Figure 9:
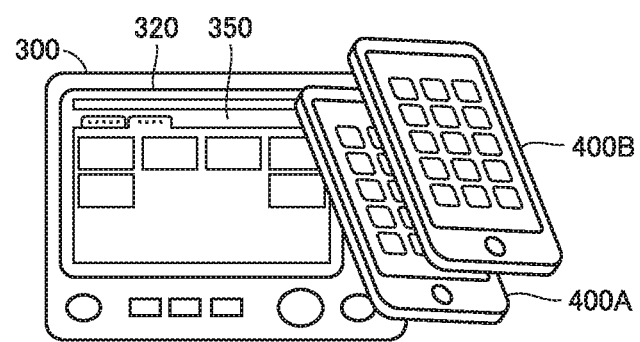
FIG. 9 is a diagram for illustrating overview of an operation of the MFP in a second embodiment.

FIG. 9 is a diagram for illustrating overview of an operation of MFP 100 in the second embodiment. In FIG. 9, portable terminal 400A represents a position of portable terminal 400 specified by the "sensed distance." Portable terminal 400B represents a position of portable terminal 400 at the time when a user actually holds portable terminal 400 over touch area 360. Both of the position shown with portable terminal 400A and the position shown with portable terminal 400B are located within a range in which near field communication with MFP 100 can be established.

In the example shown in FIG. 9, the position at which the user actually holds portable terminal 400 over touch area 360 (portable terminal 400B) is more distant from touch area 360 than a position corresponding to the "sensed distance" (portable terminal 400A). MFP 100 in the second embodiment can establish non near field radio communication with portable terminal 400 at the positions shown with both of portable terminal 400A and portable terminal 400B.

<2. Functional Configuration>

Figure 10:
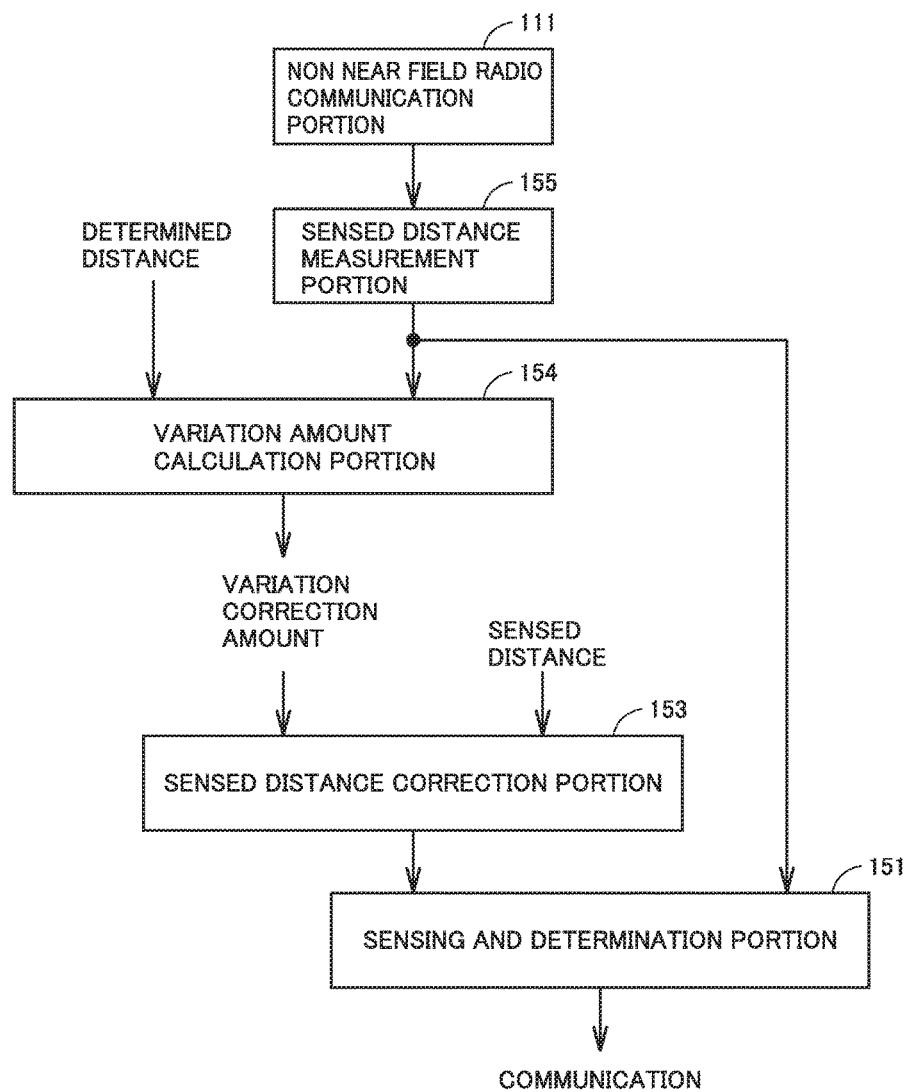
FIG. 10 is a diagram showing one example of a functional configuration of the MFP in the second embodiment.

FIG. 10 is a diagram showing one example of a functional configuration of MFP 100 in the second embodiment. As shown in FIG. 10, MFP 100 in the second embodiment includes sensing and determination portion 151, a sensed distance correction portion 153, a variation amount calculation portion 154, and a sensed distance measurement portion 155. Sensing and determination portion 151, sensed distance correction portion 153, variation amount calculation portion 154, and sensed distance measurement portion 155 are implemented, for example, by execution of an appropriate program by CPU 121.

An operation of MFP 100 in the second embodiment will be described with reference to FIG. 10.

In the second embodiment, for example, during execution of a special mode such as a calibration mode, a user arranges portable terminal 400 at a position for non near field radio communication and/or near field communication with MFP 100. When non near field radio communication portion 111 receives radio waves for "non near field radio communication" from portable terminal 400 in such a state, sensed distance measurement portion 155 measures a distance from touch area 360 to portable terminal 400. The distance is measured, for example, based on intensity of radio waves received from portable terminal 400. More specifically, sensed distance measurement portion 155 measures a distance from touch area 360 to portable terminal 400, for example, by measuring a distance from non near field radio communication unit 110 to portable terminal 400 based on intensity of radio waves and subtracting a distance from non near field radio communication unit 110 to touch area 360 (stored in advance in storage device 106) from the distance.

Then, sensed distance measurement portion 155 outputs the measured distance to variation amount calculation portion 154. In addition, sensed distance measurement portion 155 outputs the measured distance to sensing and determination portion 151.

Variation amount calculation portion 154 calculates a difference of the measured distance from a predetermined distance (a "determined distance" in FIG. 10). This "determined distance" refers, for example, to a distance from touch area 360 shown in FIG. 9 to portable terminal 400A in FIG. 9. Then, variation amount calculation portion 154 outputs the calculated difference to sensed distance correction portion 153 as a "variation correction amount." Variation amount calculation portion 154 has storage device 106 store the "variation correction amount."

Sensed distance correction portion 153 adds the "variation correction amount" to the "sensed distance" and outputs the result to sensing and determination portion 151.

Sensing and determination portion 151 compares the distance input from sensed distance measurement portion 155 with the distance input from sensed distance correction portion 153. Then, sensing and determination portion 151 allows establishment of non near field radio communication with portable terminal 400 on condition that the distance input from sensed distance measurement portion 155 is not longer than the distance input from sensed distance correction portion 153.

Namely, in the second embodiment, non near field radio communication is established on condition that a distance between touch area 360 and portable terminal 400 is not longer than a distance between touch area 360 and portable terminal 400B in FIG. 9.

Once the "variation correction amount" is specified in the special mode, the "variation correction amount" is made use of for determining whether or not to establish non near field radio communication until it is updated. Namely, control by variation amount calculation portion 154 is not carried out until next update of the "variation correction amount." When whether or not to establish non near field radio communication is to be determined, sensed distance correction portion 153 makes use of the "variation correction amount" stored in storage device 106. Sensing and determination portion 151 determines whether or not to establish non near field radio communication based on a result of comparison between the distance output from sensed distance correction portion 153 and the distance output from sensed distance measurement portion 155.

In the second embodiment, the "variation correction amount" may be stored for each user. Namely, sensed distance measurement portion 155 outputs intensity of radio waves received from portable terminal 400 to variation amount calculation portion 154, together with information specifying a user which has been received from portable terminal 400. Variation amount calculation portion 154 has storage device 106 store the "variation correction amount" specified based on the intensity obtained from sensed distance measurement portion 155 in association with the information specifying the user.

In the second embodiment, sensing and determination portion 151 can determine whether or not to establish non near field radio communication by making use of the "variation correction amount" stored for each user. Namely, sensed distance measurement portion 155 outputs intensity of radio waves received from portable terminal 400 to sensing and determination portion 151. Sensed distance measurement portion 155 outputs the information specifying the user which has been received from portable terminal 400 to sensed distance correction portion 153. Sensed distance correction portion 153 reads from storage device 106, the "variation correction amount" stored in association with the information specifying the user which has been output from sensed distance measurement portion 155. Then, sensed distance correction portion 153 adds the read "variation correction amount" to the "sensed distance" and outputs the result to sensing and determination portion 151. Sensing and determination portion 151 determines whether or not to establish non near field radio communication based on the result output from sensed distance measurement portion 155 and intensity of radio waves output from sensed distance measurement portion 155.

As the "variation correction amount" is thus stored for each user and made use of, a position at which non near field radio communication is established matches with a position at which near field communication is established, for each user.

Third Embodiment

<1. Overview>

A hardware configuration of MFP 100 in a third embodiment can be the same as in the first embodiment except for a configuration specified below. MFP 100 in the third embodiment determines whether or not to establish non near field radio communication by using non near field radio communication portion 111, by making use of a "sensed distance" (FIG. 8) made use of in the first embodiment and a distance from touch area 360 to portable terminal 400 at the time when a user actually holds portable terminal 400 over touch area 360. In the third embodiment, whether or not to establish non near field radio communication is determined based on a state of communication of a communication device for near field communication on the side of MFP 100 at the time when near field communication with portable terminal 400 is actually established.

<2. Functional Configuration>

Figure 11:
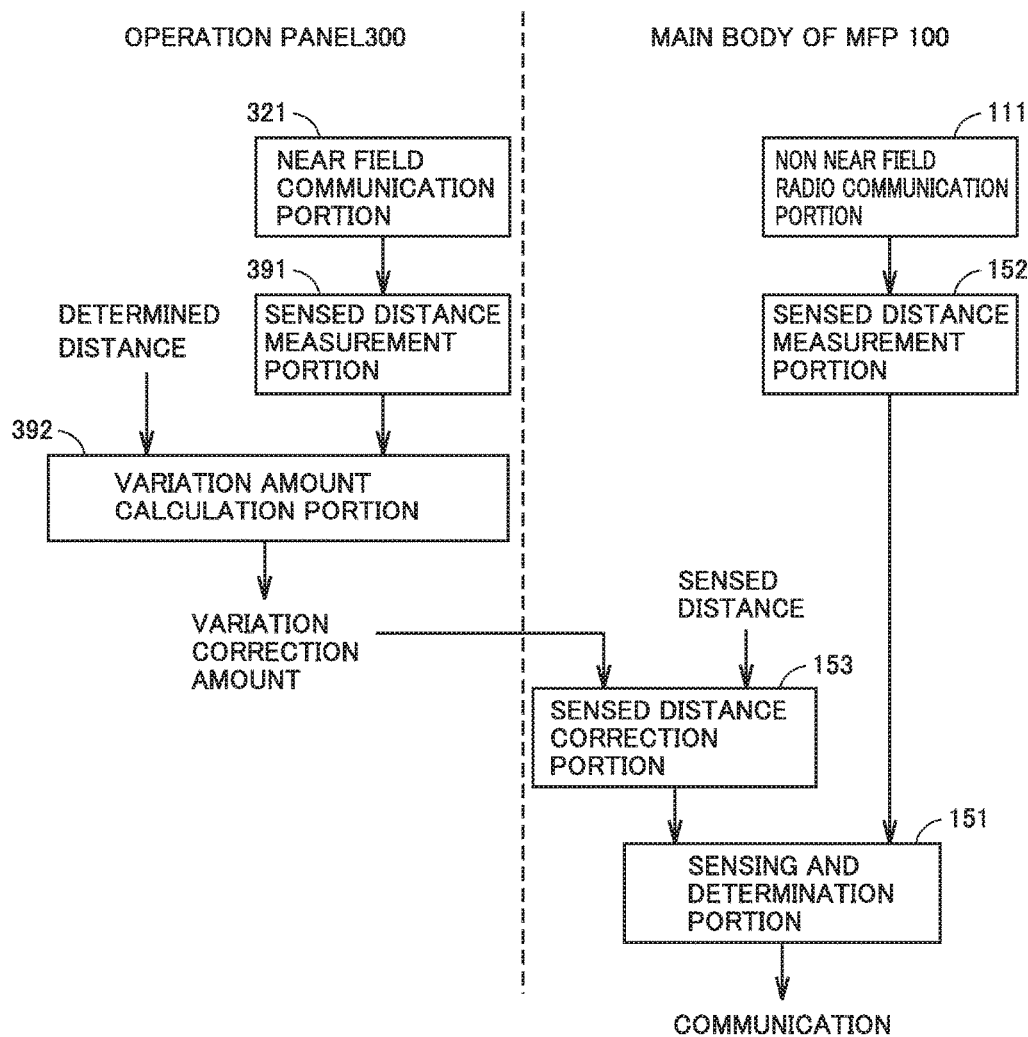
FIG. 11 is a diagram showing a functional configuration of the MFP in a third embodiment.

FIG. 11 is a diagram showing a functional configuration of MFP 100 in the third embodiment. As shown in FIG. 11, MFP 100 functions as sensing and determination portion 151, sensed distance measurement portion 152, sensed distance correction portion 153, a sensed distance measurement portion 391, and a variation amount calculation portion 392. Sensing and determination portion 151, sensed distance measurement portion 152, sensed distance correction portion 153, sensed distance measurement portion 391, and variation amount calculation portion 392 are implemented, for example, by execution of an appropriate program by CPU 121.

Referring to FIG. 11, while MFP 100 is in near field communication with portable terminal 400, sensed distance measurement portion 391 measures a distance from touch area 360 to portable terminal 400 based on a state of communication between near field communication portion 321 and portable terminal 400. Sensed distance measurement portion 391 measures the distance, for example, based on intensity of radio waves received in near field communication. More specifically, sensed distance measurement portion 391 measures a distance from touch area 360 to portable terminal 400, for example, by measuring a distance from near field communication portion 321 to portable terminal 400 based on intensity of radio waves and subtracting a distance from near field communication portion 321 to touch area 360 (stored in advance in storage device 106) from the distance.

Variation amount calculation portion 392 finds a difference between the distance input from sensed distance measurement portion 391 and a distance set in advance (a "determined distance" in FIG. 11). The "determined distance" in FIG. 11 refers, for example, to distance x shown in state (A) in FIG. 2. Then, variation amount calculation portion 392 outputs a difference between the distance input from sensed distance measurement portion 391 and the "determined distance" to sensed distance correction portion 153.

Sensed distance correction portion 153 outputs a distance calculated by adding the difference input from variation amount calculation portion 392 to the "sensed distance" to sensing and determination portion 151.

Sensed distance measurement portion 152 measures a distance between touch area 360 and portable terminal 400 based on non near field radio communication with portable terminal 400. Then, sensed distance measurement portion 152 outputs the distance obtained by measurement to sensing and determination portion 151.

Sensing and determination portion 151 compares the distance input from sensed distance measurement portion 152 and the distance input from sensed distance correction portion 153 with each other. Then, when the distance input from sensed distance measurement portion 152 is not longer than the distance input from sensed distance correction portion 153, the sensing and determination portion determines that non near field radio communication is to be established. When the distance input from sensed distance measurement portion 152 exceeds the distance input from sensed distance correction portion 153, sensing and determination portion 151 determines that non near field radio communication is not to be established.

In the third embodiment described above, sensed distance measurement portion 391 and variation amount calculation portion 392 generate a variation correction amount for correcting variation in position (a distance from touch area 360) of portable terminal 400 at the time when near field communication with MFP 100 is carried out, and output the variation correction amount to a side of the main body of MFP 100. Sensing and determination portion 151 corrects the "sensed distance" by making use of the variation correction amount and determines whether or not to establish non near field radio communication based on a result of correction.

Specifying a distance based on a state of communication may be implemented, for example, based on intensity of received radio waves or may be implemented with any other possible method.

Fourth Embodiment

<1. Overview>

A hardware configuration of MFP 100 in a fourth embodiment can be the same as in the first embodiment except for a configuration specified below.

Figure 12:
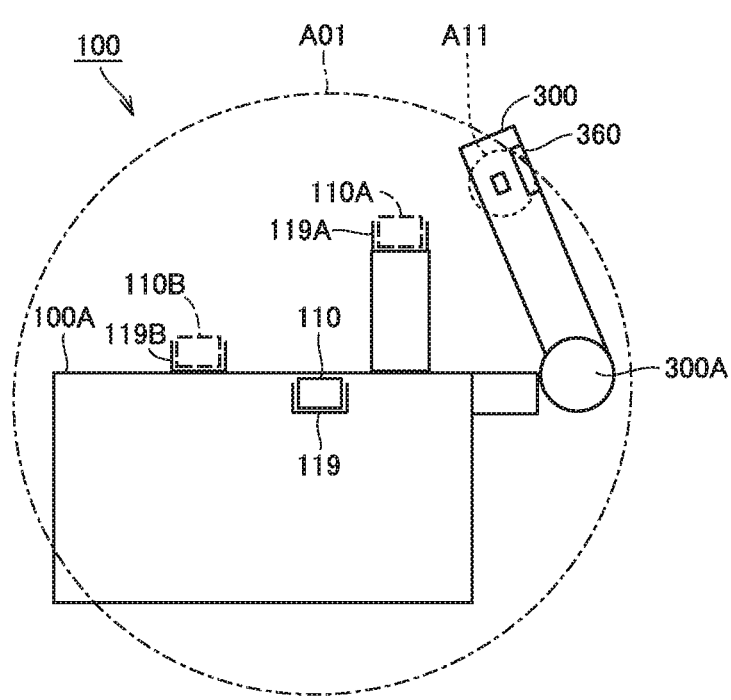
FIGS. 12 to 14 are diagrams for illustrating a configuration of the MFP in a fourth embodiment.

In the fourth embodiment, a range where communication by non near field radio communication unit 110 is established is controlled such that an outer edge portion thereof overlaps with an outer edge of a range on touch area 360 where communication by near field communication portion 321 is established. FIG. 12 is a diagram for illustrating a configuration of MFP 100 in the fourth embodiment.

In FIG. 12, a dashed line A01 represents a range where communication with non near field radio communication unit 110 is established. When portable terminal 400 is located on or inside dashed line A01, non near field radio communication unit 110 establishes non near field radio communication with portable terminal 400. Dashed line A01, for example, draws a circle around non near field radio communication unit 110. A radius of dashed line A01 represents a distance over which communication in non near field radio communication is established.

A dashed line A11 represents a range where communication by near field communication portion 321 is established. When portable terminal 400 is located on or inside dashed line A11, near field communication portion 321 establishes near field communication with portable terminal 400.

In the fourth embodiment, the range where communication by non near field radio communication unit 110 is established (dashed line A01) is controlled such that an outer edge portion thereof overlaps with an outer edge of a range on touch area 360 (dashed line A11) where communication by near field communication portion 321 is established. In FIG. 12, non near field radio communication unit 110 is set in a case 119. Case 119 includes a connector for connection of non near field radio communication unit 110 to CPU 121. Non near field radio communication unit 110 includes a connector, and as the connector is connected to the connector of case 119, non near field radio communication unit 110 is electrically connected to CPU 121.

In MFP 100 in the fourth embodiment, a position where non near field radio communication unit 110 is attached can be selected from among a plurality of positions. FIG. 12 shows a position of attachment other than case 119, such as cases 119A and 119B. Cases 119A and 119B are provided in order to place non near field radio communication units 110A and 110B at respective positions. Cases 119A and 119B each include a connector for connection of non near field radio communication unit 110 to CPU 121.

Figure 13:
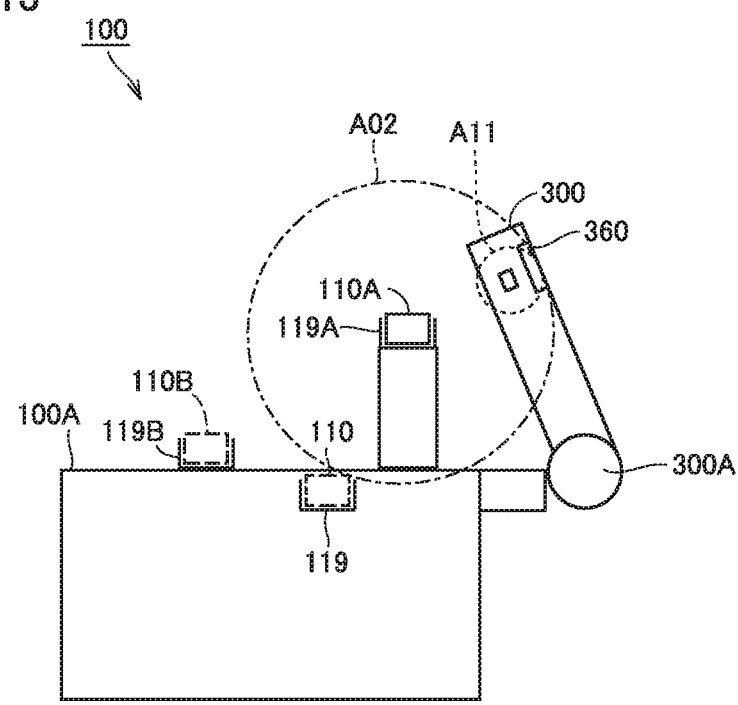

FIG. 13 shows with a dashed line A02, a range where communication through non near field radio communication is established at the time when non near field radio communication unit 110 is attached to a position shown with non near field radio communication unit 110A. The range shown with dashed line A02, for example, draws a circle around non near field radio communication unit 110A. Namely, a radius of dashed line A02 represents a distance over which communication through non near field radio communication is established for non near field radio communication unit 110A. An outer edge portion of the range shown with dashed line A02 overlaps with the outer edge (dashed line A11) of the range on touch area 360 where communication by near field communication portion 321 is established.

Figure 14:
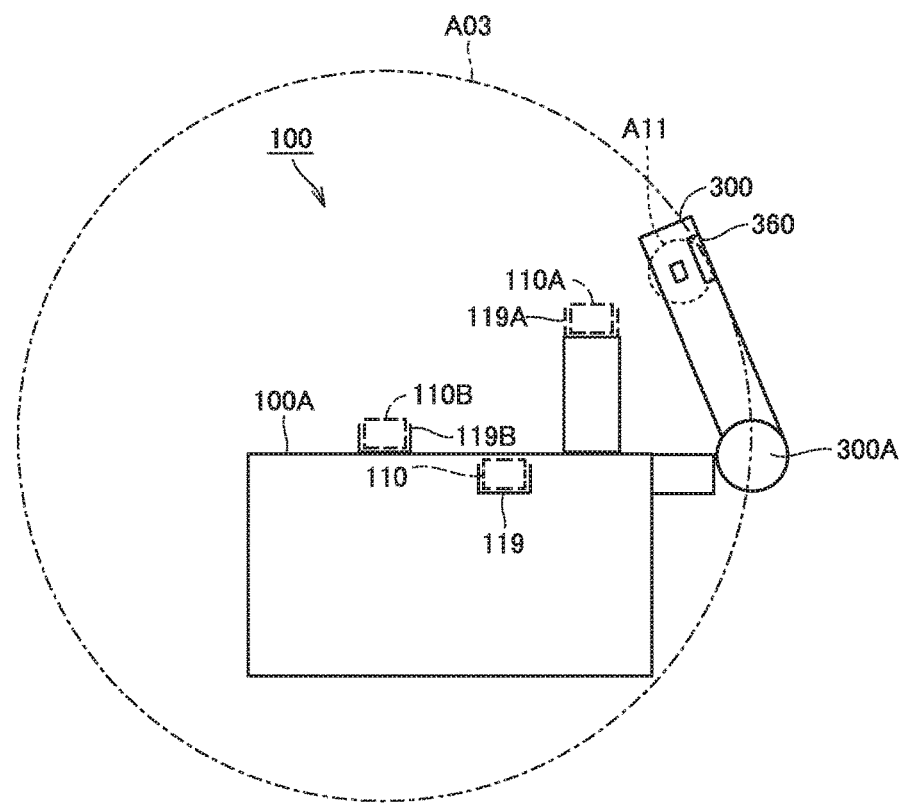

FIG. 14 shows with a dashed line A03, a range where communication through non near field radio communication is established at the time when non near field radio communication unit 110 is attached to a position shown with non near field radio communication unit 110B. The range shown with dashed line A03, for example, draws a circle around non near field radio communication unit 110B. Namely, a radius of dashed line A03 represents a range where communication through non near field radio communication is established for non near field radio communication unit 110B. An outer edge portion of the range shown with dashed line A03 overlaps with the outer edge (dashed line A11) of the range on touch area 360 where communication by near field communication portion 321 is established.

As described with reference to FIGS. 12 to 14, in MFP 100 in the fourth embodiment, regardless of a position of attachment of non near field radio communication unit 110, a manner of communication of non near field radio communication unit 110 is controlled such that the outer edge portion of the range where communication by non near field radio communication unit 110 is established overlaps with the outer edge of coverage of near field communication portion 321.

<2. Functional Configuration>

Figure 15:
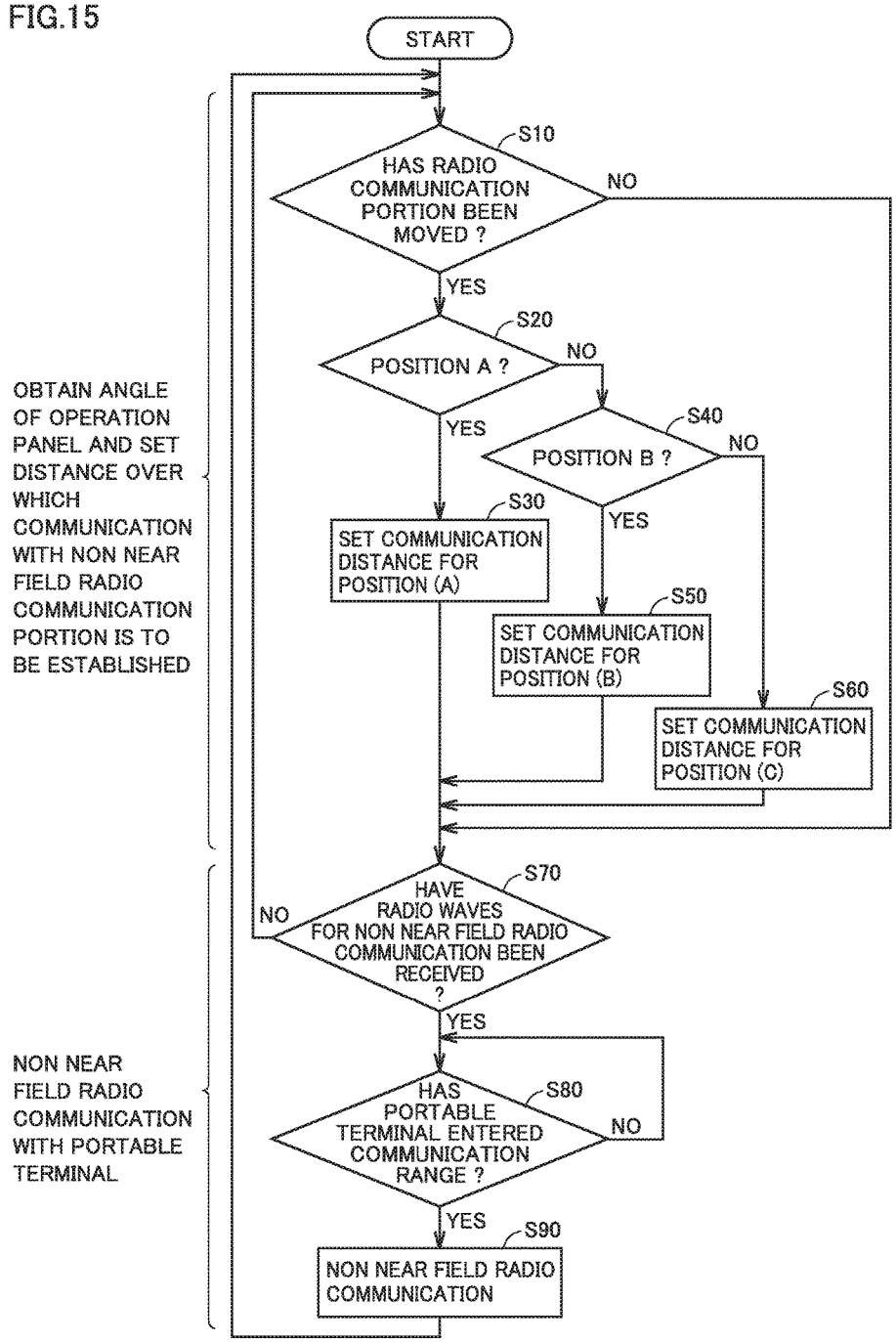
FIG. 15 is a flowchart of processing performed in the MFP in the fourth embodiment.

FIG. 15 is a flowchart of processing performed by CPU 121 of MFP 100 in the fourth embodiment. Processing in FIG. 15 is performed after a range where communication through non near field radio communication as described in any of the first to third embodiments is established is adjusted, for further adjusting the range with change in position of non near field radio communication unit 110, for example, in connection with a position shown with non near field radio communication unit 110 in FIG. 12. In the description below, a position shown with "non near field radio communication unit 110A" in FIG. 12 is referred to as a "position A," a position shown with "non near field radio communication unit 110B" is referred to as a "position B," and a position shown with "non near field radio communication unit 110" is referred to as a "position C."

Referring to FIG. 15, in step S10, CPU 121 determines whether or not a position of non near field radio communication unit 110 (non near field radio communication portion 110) has been changed. When CPU 121 determines that the position has been changed (YES in step S10), control proceeds to step S20. When CPU 121 determines that the position has not been changed (NO in step S10), control proceeds to step S70. For example, when disconnection between the connector provided in any of cases 119, 119A, and 119B and non near field radio communication unit 110 is detected, it is determined that the position of attachment of non near field radio communication unit 110 has been changed.

In step S20, CPU 121 determines whether or not a position after change of non near field radio communication unit 110 is "position A" (non near field radio communication unit 110A in FIG. 12). Namely, CPU 121 determines whether or not the connector connected to non near field radio communication unit 110 after disconnection detected in step S10 is the connector of case 119A. When CPU 121 determines that the position after change is position A (YES in step S20), control proceeds to step S30. When CPU 121 determines that the position after change is not position A (NO in step S20), control proceeds to step S40.

In step S30, CPU 121 changes a range where communication by non near field radio communication unit 110 is established to a range for position A (dashed line A02 in FIG. 13). Then, control proceeds to step S70.

In step S40, CPU 121 determines whether or not a position after change of non near field radio communication unit 110 is "position B" (non near field radio communication unit 110B in FIG. 12). Namely, CPU 121 determines whether or not the connector connected to non near field radio communication unit 110 after disconnection detected in step S10 is the connector of case 119B. Then, when CPU 121 determines that a position after change is position B (YES in step S40), control proceeds to step S50. When CPU 121 determines that a position after change is not position B (NO in step S40), control proceeds to step S60.

In step S50, CPU 121 changes a range where communication by non near field radio communication unit 110 is established to a range for position B (dashed line A03 in FIG. 14). Then, control proceeds to step S70.

In step S60, CPU 121 changes a range where communication by non near field radio communication unit 110 is established to a range for position C (dashed line A01 in FIG. 12). Then, control proceeds to step S70.

In step S70, CPU 121 determines whether or not non near field radio communication unit 110 has received radio waves from portable terminal 400. When CPU 121 determines that non near field radio communication unit 110 has received radio waves (YES in step S70), control proceeds to step S80. When CPU 121 determines that non near field radio communication unit 110 has not received radio waves (NO in step S70), control returns to step S10.

In step S80, CPU 121 determines whether or not portable terminal 400 has come close to MFP 100 (touch area 360 in FIG. 1) and entered the range set in any of steps S30, 50, and 60. When CPU 121 determines that portable terminal 400 has not yet entered the communication range (NO in step S80), control remains at step S80. When CPU 121 determines that portable terminal 400 has entered the range (YES in step S80), control proceeds to step S90.

In step S90, CPU 121 has non near field radio communication with portable terminal 400 established. Then, control returns to step S10.

In the fourth embodiment described above, when a position of attachment of non near field radio communication unit 110 is changed, a range where communication by non near field radio communication unit 110 at a position after change is established is controlled such that an outer edge portion thereof overlaps with an outer edge of coverage of near field communication portion 321 on touch area 360.

Fifth Embodiment

<1. Overview>

Figure 16:
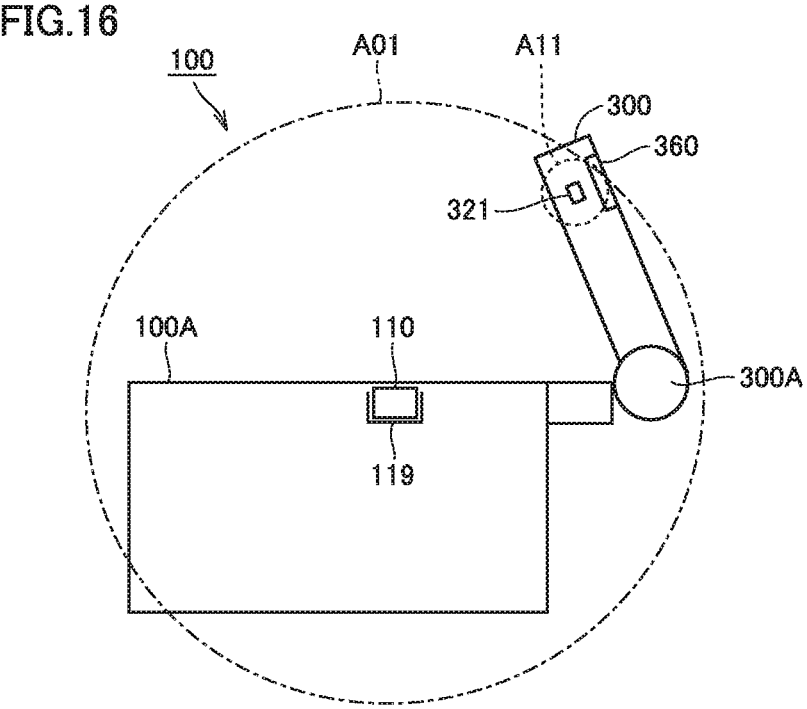
FIG. 16 is a diagram showing one example of a position of the operation panel in the MFP in a fifth embodiment.
Figure 17:
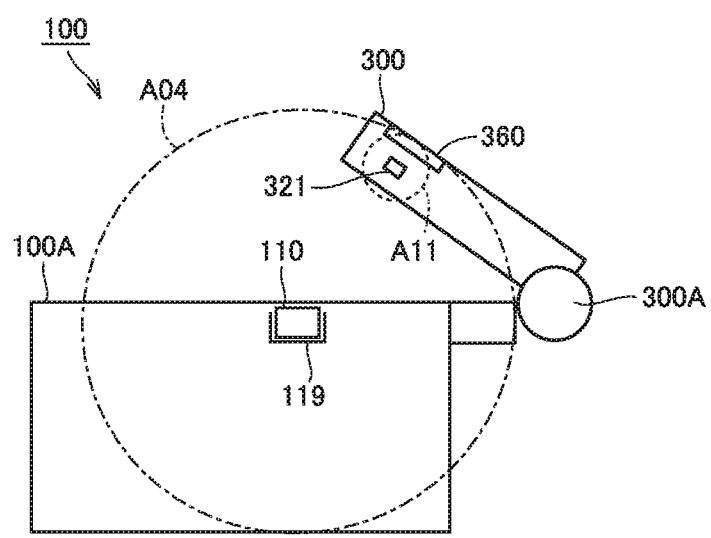
FIG. 17 is a diagram showing another example of a position of the operation panel in the MFP in the fifth embodiment.
Figure 18:
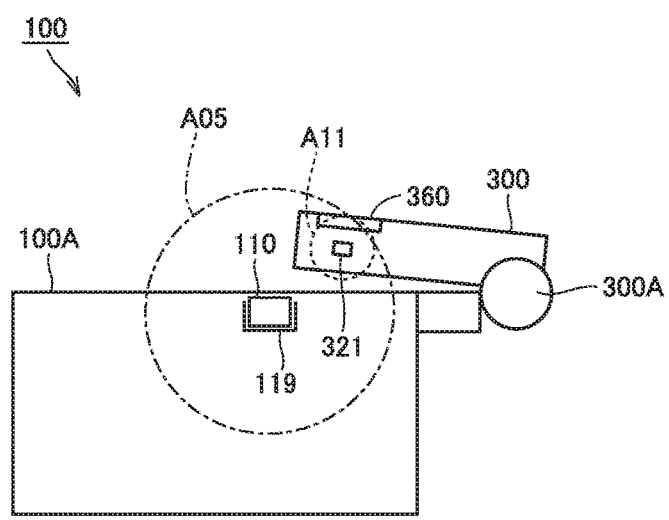
FIG. 18 is a diagram showing yet another example of a position of the operation panel in the MFP in the fifth embodiment.

A hardware configuration of MFP 100 in a fifth embodiment can be the same as in the first embodiment except for a configuration specified below. In MFP 100 in the fifth embodiment, even when a relative position between non near field radio communication unit 110 and near field communication portion 321 is changed with change in position of operation panel 300, a range where communication by non near field radio communication unit 110 is established is controlled such that an outer edge portion thereof overlaps with an outer edge of a range on touch area 360 where communication by near field communication portion 321 is established. FIGS. 16 to 18 each show a variation in position of near field communication portion 321.

In FIG. 16, a main surface of operation panel 300 is inclined by approximately 60° with respect to a horizontal direction. As shown in FIG. 16, here, a range where communication by non near field radio communication unit 110 is established is controlled as shown with dashed line A01. Dashed line A01 draws a circle around non near field radio communication unit 110. Dashed line A11 represents a range where communication by near field communication portion 321 is established. Dashed line A01 and dashed line A11 overlap with each other in touch area 360.

In FIG. 17, the main surface of operation panel 300 is inclined by approximately 30° with respect to the horizontal direction. A range where communication by non near field radio communication unit 110 is established here is controlled as shown with a dashed line A04. Dashed line A04 draws a circle around non near field radio communication unit 110.

In FIG. 18, the main surface of operation panel 300 is inclined by approximately 5° with respect to the horizontal direction. A range where communication by non near field radio communication unit 110 is established here is controlled as shown with a dashed line A05. Dashed line A05 draws a circle around non near field radio communication unit 110.

MFP 100 includes, for example, a sensor for detecting an angle of inclination of operation panel 300. CPU 121 obtains the angle of inclination (an angle of rotation around a hinge 300A) of operation panel 300 by obtaining detection output from the sensor.

<2. Functional Configuration>

Figure 19:
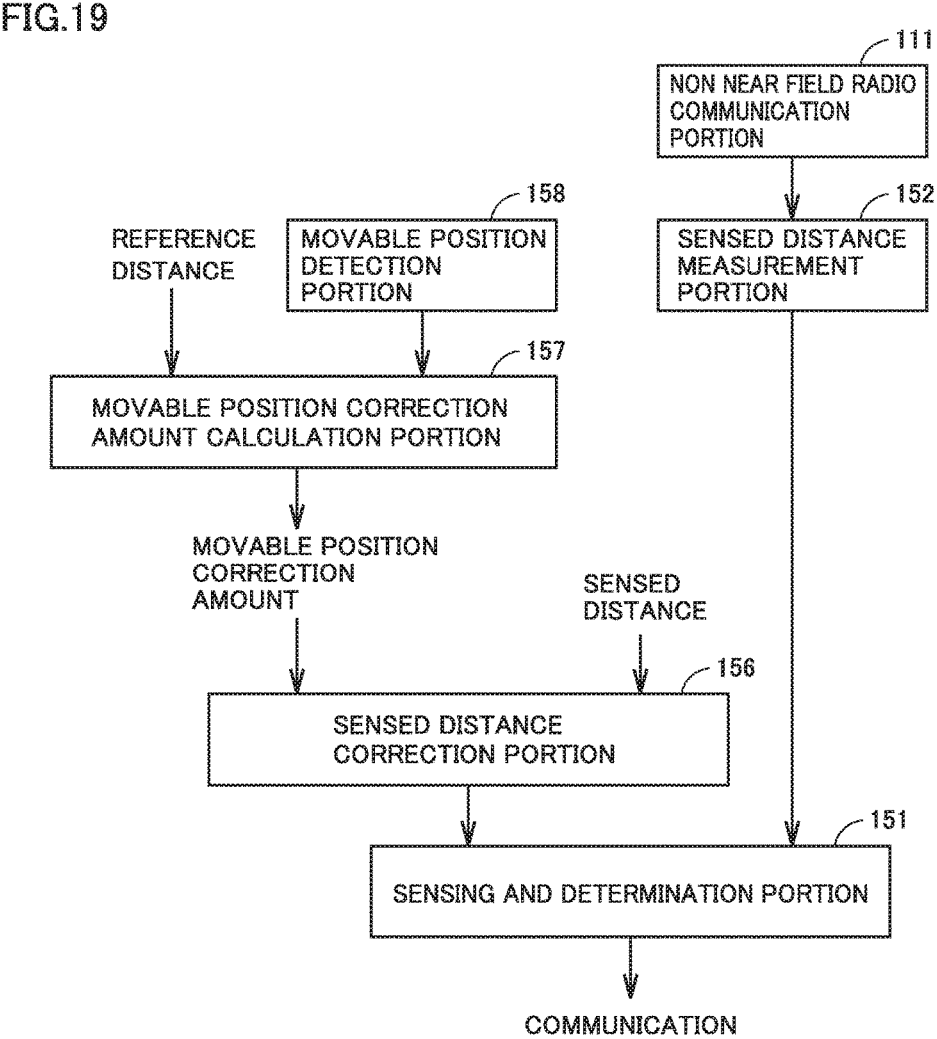
FIG. 19 is a diagram showing a functional configuration of the MFP in the fifth embodiment.

FIG. 19 is a diagram showing a functional configuration of MFP 100 in the fifth embodiment.

MFP 100 in the fifth embodiment includes sensing and determination portion 151, sensed distance measurement portion 152, a sensed distance correction portion 156, a movable position correction amount calculation portion 157, and a movable position detection portion 158. Sensing and determination portion 151, sensed distance measurement portion 152, sensed distance correction portion 156, movable position correction amount calculation portion 157, and movable position detection portion 158 are implemented, for example, by execution of an appropriate program by CPU 121.

In MFP 100 in the fifth embodiment, movable position detection portion 158 obtains a position of operation panel 300 (an angle of inclination of operation panel 300) and outputs the position to movable position correction amount calculation portion 157. Thus, for example, the fact that the position of operation panel 300 is any position in FIGS. 16 to 18 is output to movable position correction amount calculation portion 157.

Movable position correction amount calculation portion 157 calculates a difference between a distance corresponding to a position output from movable position detection portion 158 (a radius of dashed line A01 in FIG. 16, dashed line A04 in FIG. 17, and dashed line A05 in FIG. 18) and a reference communication distance. The reference communication distance refers, for example, to a radius of a circle shown with dashed line A11 shown in FIG. 16. Movable position correction amount calculation portion 157 outputs the calculated difference as a "movable position correction amount" to sensed distance correction portion 156.

Sensed distance correction portion 156 outputs a value calculated by adding the "movable position correction amount" to the "sensed distance" to sensing and determination portion 151 as the "corrected sensed distance."

Sensed distance measurement portion 152 measures a distance from touch area 360 to portable terminal 400 based on radio waves received by non near field radio communication portion 111 and outputs the distance to sensing and determination portion 151.

When the distance from touch area 360 to portable terminal 400 output from sensed distance measurement portion 152 is not greater than the "corrected sensed distance" output from sensed distance correction portion 156, sensing and determination portion 151 allows establishment of non near field radio communication. When the distance from touch area 360 to portable terminal 400 output from sensed distance measurement portion 152 exceeds the "corrected sensed distance," sensing and determination portion 151 does not allow establishment of non near field radio communication.

<3. Flow of Processing>

FIG. 20 is a flowchart of processing performed for adjusting a distance for establishing communication through non near field radio communication in accordance with a position of operation panel 300 in the fifth embodiment.

Referring to FIG. 20, in step SA10, CPU 121 determines whether or not near field communication portion 321 has been moved with change in position of operation panel 300. When CPU 121 determines that near field communication portion 321 has been moved (YES in step SA10), control proceeds to step SA20. When CPU 121 determines that near field communication portion 321 has not been moved (NO in step SA10), control proceeds to step SA70.

In the description below, three positions of a "position (1)," a "position (2)," and a "position (3)" are mentioned as positions of near field communication portion 321. "Position (1)" is a position of near field communication portion 321 in FIG. 16. "Position (2)" is a position of near field communication portion 321 in FIG. 17. "Position (3)" is a position of near field communication portion 321 in FIG. 18.

In step SA20, CPU 121 determines whether or not a position after change of near field communication portion 321 is "position (1)" (FIG. 16). When CPU 121 determines that the position after change is position (1) (YES in step SA20), control proceeds to step SA30. When CPU 121 determines that the position after change is not position (1) (NO in step SA20), control proceeds to step SA40.

In step SA30, CPU 121 changes a range where communication by non near field radio communication unit 110 is established to a range for position (1) (dashed line A01 in FIG. 16). Then, control proceeds to step SA70.

In step SA40, CPU 121 determines whether or not a position after change of near field communication portion 321 is "position (2)" (FIG. 17). When CPU 121 determines that the position after change is position (2) (YES in step SA40), control proceeds to step SA50. When CPU 121 determines that the position after change is not position (2) (NO in step SA40), control proceeds to step SA60.

In step SA50, CPU 121 changes a range where communication by non near field radio communication unit 110 is established to a range for position (2) (dashed line A04 in FIG. 17). Then, control proceeds to step SA70.

In step SA60, CPU 121 allows a range where communication by non near field radio communication unit 110 is established to proceed to a range for position (3) (dashed line A05 in FIG. 18). Then, control proceeds to step SA70.

In step SA70, CPU 121 determines whether or not non near field radio communication unit 110 has received radio waves from portable terminal 400. When CPU 121 determines that non near field radio communication unit 110 has received radio waves (YES in step SA70), control proceeds to step SA80. When CPU 121 determines that non near field radio communication unit 110 has not received radio waves (NO in step SA70), control returns to step SA10.

In step SA80, CPU 121 determines whether or not portable terminal 400 has come close to MFP 100 (touch area 360 in FIG. 1) and entered the range set in any of steps SA30, 50, and 60. When CPU 121 determines that portable terminal 400 has not yet entered the range (NO in step SA80), control remains at step SA80. When CPU 121 determines that portable terminal 400 has entered the range (YES in step SA80), control proceeds to step SA90.

In step SA90, CPU 121 allows establishment of non near field radio communication with portable terminal 400. Then, control returns to step SA10.

In the fifth embodiment described above, when a position of operation panel 300 is changed, a range where communication by non near field radio communication unit 110 is established is adjusted such that an outer edge portion thereof overlaps with an outer edge of a range on touch area 360 where communication by near field communication portion 321 is established.

Sixth Embodiment

A hardware configuration of MFP 100 in a sixth embodiment can be the same as in the first embodiment except for a configuration specified below. In MFP 100 in the sixth embodiment, instead of CPU 121 determining whether or not a position of operation panel 300 has been changed, a user provides input through operation panel 300.

FIG. 21 is a flowchart of processing for adjusting a range where communication through non near field radio communication is established with change in position of near field communication portion 321. In processing in FIG. 21, control in step SA10 to step SA60 in FIG. 20 is replaced with step SB10 to step SB30. Namely, in the processing in FIG. 20, CPU 121 detects a position after change of near field communication portion 321 and a range where non near field radio communication is established is set in accordance with the position after change of near field communication portion 321, whereas in processing in FIG. 21, CPU 121 sets a range where non near field radio communication is established in accordance with an angle of operation panel 300 input by a user.

More specifically, in step SB10, CPU 121 determines whether or not angle of operation panel 300 has been input onto operation panel 300. When CPU 121 determines that no input has been provided (NO in step SB10), control proceeds to step SA70. When CPU 121 determines that an angle of operation panel 300 has been input (YES in step SB10), control proceeds to step SB20.

In step SB20, CPU 121 obtains the input angle. The input angle is, for example, any of 60° (FIG. 16), 30° (FIG. 17), and 5° (FIG. 18). Then, control proceeds to step SB30.

In step SB30, CPU 121 sets a range where non near field radio communication is established to the range shown in any of FIGS. 16 to 18 (dashed line A01, dashed line A04, or dashed line A05), in accordance with the input angle of operation panel 300. Then, control proceeds to step SA70.

Then, CPU 121 carries out control in step SA70 to step SA90 as carried out in the processing in FIG. 20.

In MFP 100 in the fifth and sixth embodiments, an angle of operation panel 300 is selected from among those shown in FIGS. 16 to 18. Control in MFP 100, however, is not restricted to such a manner. For an angle of operation panel 300 other than these, a range where communication by non near field radio communication unit 110 is established can be adjusted.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An image processing apparatus, comprising:
    a first communication portion configured to wirelessly communicate with a terminal over a wireless communication distance;
    a second communication portion configured to carry out near field communication with the terminal over a near field communication distance;
    the near field communication distance between the second communication portion and the terminal being shorter than the wireless communication distance between the first communication portion and the terminal; and
    a hardware processor configured to adjust the wireless communication distance to being limited to equal the near field communication distance at which the second communication portion establishes communication with the terminal, wherein the first communication portion is configured to avoid establishing communication with the terminal when the communication distance between the first communication portion and the terminal is greater than the near field communication distance after the hardware processor has adjusted the wireless communication distance to be equal to the near field communication distance.

2. The image processing apparatus according to claim 1, wherein the hardware processor is configured to adjust the communication-established distance by having the first communication portion start communication with the terminal when the terminal comes close to a specific position at which the second communication portion establishes communication with the terminal based on radio wave intensity exhibited by radio waves received from the terminal in the first communication portion.

3. The image processing apparatus according to claim 2, wherein the hardware processor is configured not to allow establishment of communication with the terminal when the radio wave intensity is lower than prescribed radio wave intensity corresponding to the radio waves received at a specific position at which the second communication portion establishes communication with the terminal and to allow establishment of communication with the terminal when radio waves having intensity not lower than the prescribed radio wave intensity have been received.

4. The image processing apparatus according to claim 3, wherein
    the radio wave intensity is brought in correspondence with a distance, and
    the hardware processor is configured to compare a first distance corresponding to the radio wave intensity of the radio waves received from the terminal with a second distance corresponding to the prescribed radio wave intensity.

5. The image processing apparatus according to claim 1, wherein on the image processing apparatus, the first communication portion is arranged at a position different from a position of the second communication portion.

6. The image processing apparatus according to claim 1, wherein a specific position at which the second communication portion establishes communication with the terminal is a portion in a touch area over which the terminal is to be held above the image processing apparatus.

7. The image processing apparatus according to claim 1, wherein the second communication portion is arranged in an operation panel.

8. The image processing apparatus according to claim 1, wherein the hardware processor is configured to correct the communication-established distance based on a state of communication between the terminal and the first communication portion at a position where radio communication with the first communication portion will be established.

9. The image processing apparatus according to claim 1, wherein the hardware processor is configured to correct the communication-established distance based on a state of communication between the terminal and the second communication portion at a position where radio communication with the first communication portion will be established.

10. The image processing apparatus according to claim 1, further comprising:
two or more attachment portions for attaching the first communication portion, which are different from one another in distance to a specific position at which the second communication portion establishes communication with the terminal; and
the hardware processor being configured to obtain information specifying to which of the two or more attachment portions the first communication portion has been attached, wherein
the hardware processor corrects the communication-established distance based on the information obtained by the first obtaining portion.

11. The image processing apparatus according to claim 10, wherein the hardware processor is configured to accept input of the information specifying to which of the two or more attachment portions the first communication portion has been attached.

12. The image processing apparatus according to claim 1, further comprising:
an operation panel in which the second communication portion and a specific position at which the second communication portion establishes communication with the terminal are arranged; and
the hardware processor being configured to obtain a position of the operation panel, wherein
the hardware processor is configured to correct the communication-established distance based on the position obtained.

13. The image processing apparatus according to claim 12, wherein the hardware processor is configured to accept input of information designating a position of the operation panel.

14. A method of controlling an image processing apparatus, the image processing apparatus including a first communication portion wirelessly communicating with a terminal over a wireless communication distance and a second communication portion carrying out near field communication with the terminal over a near field communication distance that is shorter than the wireless communication distance, the method comprising adjusting the wireless communication distance to being limited to equal the near field communication distance at which the second communication portion establishes communication with the terminal, wherein the first communication portion avoids establishing communication with the terminal when the communication distance between the first communication portion and the terminal is greater than the near field communication distance after the adjusting of the wireless communication distance to be equal to the near field communication distance.

15. The method according to claim 14, wherein the adjusting the communication-established distance is to have the first communication portion start communication with the terminal when the terminal comes close to a specific position at which the second communication portion establishes communication with the terminal based on radio wave intensity exhibited by radio waves received from the terminal in the first communication portion.

16. The method according to claim 15, wherein the adjusting the communication-established distance is not to allow establishment of communication with the terminal when the radio wave intensity is lower than prescribed radio wave intensity corresponding to the radio waves received at the specific position and to allow establishment of communication with the terminal when radio waves having intensity not lower than the prescribed radio wave intensity have been received.

17. A non-transitory storage medium storing a program executed by a computer of an image processing apparatus including a first communication portion wirelessly communicating with a terminal over a wireless communication distance and a second communication portion carrying out near field communication with the terminal over a near field communication distance which is shorter than the wireless communication distance, the program causing the image processing apparatus to adjust the wireless communication distance to being limited to equal the near field communication distance at which the second communication portion establishes communication with the terminal, wherein the first communication portion avoids establishing communication with the terminal when the communication distance between the first communication portion and the terminal is greater than the near field communication distance after the hardware processor has adjusted the wireless communication distance to be equal to the near field communication distance.

18. The non-transitory storage medium according to claim 17, the program causing the image processing apparatus to adjust a communication-established distance by having the first communication portion start communication with the terminal when the terminal comes close to a specific position at which the second communication portion establishes communication with the terminal based on radio wave intensity exhibited by radio waves received from the terminal in the first communication portion.

19. The non-transitory storage medium according to claim 18, wherein the program causes the image processing apparatus to adjust a communication-established distance by not allowing establishment of communication with the terminal when the radio wave intensity is lower than prescribed radio wave intensity corresponding to the radio waves received at the specific position and by allowing establishment of communication with the terminal when radio waves having intensity not lower than the prescribed radio wave intensity have been received.

* * * * *